(12) United States Patent
Faber

(10) Patent No.: US 6,405,052 B1
(45) Date of Patent: Jun. 11, 2002

(54) METHOD FOR POWER CONTROL DURING CALL ACQUISITION IN CDMA MOBILE COMMUNICATION SYSTEMS

(75) Inventor: Ulrich Faber, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/317,920

(22) Filed: May 25, 1999

(30) Foreign Application Priority Data

May 28, 1998 (JP) .......................................... 10-147358

(51) Int. Cl.[7] .................................................. H04B 7/00
(52) U.S. Cl. ............................ 455/522; 455/69; 455/63; 370/252
(58) Field of Search ........................... 455/522, 69, 63, 455/67.1

(56) References Cited

U.S. PATENT DOCUMENTS

| | | | | |
|---|---|---|---|---|
| 5,839,056 A | * | 11/1998 | Hakkinen | 455/69 |
| 5,862,453 A | * | 1/1999 | Love et al. | 455/69 |
| 6,075,974 A | * | 6/2000 | Saints et al. | 455/69 |
| 6,272,354 B1 | * | 8/2000 | Saario | 455/522 |
| 6,157,619 A | * | 12/2000 | Ozluturk et al. | 370/252 |
| 6,173,188 B1 | * | 1/2001 | Kim | 455/522 |

FOREIGN PATENT DOCUMENTS

| | | |
|---|---|---|
| JP | 6-132872 | 5/1994 |
| JP | 7-177126 | 7/1995 |
| JP | 8-32514 | 2/1996 |
| JP | 8-32515 | 2/1996 |
| JP | 09-312609 | 12/1997 |
| JP | 10-502778 | 3/1998 |
| JP | 11-122167 | 4/1999 |
| JP | 11-177488 | 7/1999 |

* cited by examiner

Primary Examiner—Daniel Hunter
Assistant Examiner—Alan T. Gantt
(74) Attorney, Agent, or Firm—Sughrue Mion, PLLC

(57) ABSTRACT

A method for keeping the closed loop adjustment of the transmission power of the mobile station in a CDMA mobile communication system almost constant until the base station succeeds in decoding the first preamble frame without error, thus reducing interference by preventing transmission power overshoot.

16 Claims, 6 Drawing Sheets

METHOD FOR POWER CONTROL DURING CALL ACQUISITION IN CDMA MOBILE COMMUNICATION SYSTEMS

BACKGROUND OF THE INVENTION

1. Field of the Invention

This invention relates to a method for power control in code division multiplex access (CDMA) mobile communication systems, and more particularly to a method for power control during call acquisition in CDMA mobile communication systems.

2. Description of the Related Art

In CDMA mobile communication systems all users called mobile stations share the same frequency band when communicating with one or more base stations.

As mobile stations and base stations communicate simultaneously two separate frequency bands are provided, one band for the forward link (from the base station to the mobile station) and one band for the reverse link (from the mobile station to the base station). Each channel on the forward link or reverse link is separated by a particular spreading code by which a narrow band payload information (e.g. data or voice) is spread over the considerably larger channel bandwidth and transmitted. The receiver is able to recover the payload information of the transmitted spreaded signal by correlating it with the particular spreading code, while other not correlated signals (e.g. interference and noise) included in the received spreaded signal are weakened. Thus, signal interference ratio (SIR) can be enhanced by the process gain which is proportional to the quotient of channel bandwidth and narrow band payload information bandwidth. Such a CDMA system is well known in the art.

Since the frequency band on the forward link or on the reverse link respectively is used by all mobile stations, they cause interference to each other. The capacity of CDMA cellular communication systems, which means the maximum number of mobile stations being able to communicate with a base station simultaneously, is limited by the maximum permitted bit error rate (BER) of the decoded despreaded signal in the receiver which is inversely proportional to the SIR. Hence, the system capacity is limited by the interference.

In a highly dynamic environment of a mobile communication system where establishing and releasing of calls, movement of the mobile station, fading, shadowing, handoff, and other effects cause a permanent fluctuation of the received SIR an efficient power control method is necessary to maintain high quality communication and maximum system capacity.

It is well known to those skilled in the art that a reverse linkpower control method typically controls the transmitted power of the mobile station so that the required BER for each mobile station at the base station can be achieved with a minimum SIR.

A so-called open loop power control compensates for the path loss between the mobile station and the base station. The mobile station measures the received input power on the forward link and adjusts its transmission power level accordingly. A mobile station which is more distant from the base station or one which experiences a stronger fading loss will transmit with more power than a mobile station which is for example close to the base station. Obviously the near-far effect can be mitigated.

As previously mentioned, the forward and the reverse link use different frequencies implying an independent fading characteristic, and thus only open. loop power control is insufficient. Using a so-called closed loop power control method takes that problem into account. The base station measures the SIR of the received reverse link signal from a particular mobile station and compares it to a threshold and sends a power control adjustment signal on the forward link to the particular mobile station requesting it to adjust its transmission power. Typically, the power control adjustment is sent by one or more power control bits. If the SIR is less than the threshold, the particular mobile station will be requested to increase its transmission power level by a small amount (e.g. 1 dB). On the other hand, in case the SIR is larger than the threshold, the mobile station will be requested to decrease its transmission power level by a small amount (e.g. 1 dB). Typically, power control bits are sent about every millisecond. That period thus is generally referred as power control group.

Further, the level of the threshold is controlled in such a manner that the required BER is achieved with the lowest possible SIR. In other words, the threshold is increased when the actually measured BER is larger than the required BER, and in the case when the actually measured BER is smaller than the required BER, the threshold is decreased.

Similarly, in forward link power control the mobile station measures its received SIR on the forward link against a threshold, and accordingly, sends a kind of power adjustment request to the base station on the reverse link.

FIG. 5 shows a simplified protocol between a mobile station and a base station during call acquisition when establishing a forward and reverse link communication channel as it is well known in the art.

Upon request, the base station initializes a forward and a reverse link communication channel S10 and starts transmitting on the forward link S11. A channel assignment order will be sent to the mobile station causing the mobile station to initialize its forward and reverse link communication channel process S20 and start the acquisition of the forward link S21. After having received and decoded the forward link communication channel S22, the mobile station starts sending a preamble signal on the reverse link communication channel and starts the closed loop power control process S23, and thereafter waits for the base station to send an acknowledgement indicating that the preamble has been received. After sending the channel assignment order, the base station starts the acquisition of the reverse link communication channel S12 and starts the closed loop power control S13. Finally, after succeeding in receiving and decoding the preamble S14, the base station sends an acknowledgement to the mobile station.

FIG. 1 shows a receiver and transmitter configuration used in a conventional closed loop power control method in a base station of CDMA mobile communication system.

A multipath signal transmitted by a mobile station is received by an antenna 101, and relayed to a down converter 103 via a radio frequency distributor 1.02. The signal is down-converted into a digital IF signal which is input into the demodulator 104. Each correlator $14_1$, $14_2$, . . . , $14_n$ applies the spreading code determined by the mobile station to the input signal of the demodulator 104 to extract the multipaths which are combined in the summer 140. The output signal of the summer 140 is coupled to the decoder 105, while the SIR of the output signal is measured and sent to the detector 106. The decoder 105 finally processes the original payload information signal, and determines the communication quality by measuring the BER of the decoded payload. The BER is output to the detector 106.

The detector 106 relays the BER and SIR information to the closed loop power controller 107. The closed loop power controller 107 runs the closed loop power control algorithm. FIG. 2 depicts the flow chart of a conventional closed loop power control algorithm S300 that is initiated after the base station has sent the channel assignment order S13. After initialization of the BER threshold and SIR threshold with nominal values S301, the SIR value received from the detector 106 is compared to the SIR threshold. If the SIR is larger than the SIR threshold, decrement power control bits are inserted into the forward link signal 109 which cause a decrease in the mobile station's transmission power S303. If the SIR is smaller than the SIR threshold the power control bits will force the mobile station to increase its transmission power level S304.

Further, the BER is compared to its BER threshold as well S305. If the BER is lower than the BER threshold the SIR threshold value is decreased which in the long term, causes a higher transmission power of the mobile station. On the other hand, a BER larger than the BER threshold leads to an increase of the SIR threshold value S307. The steps S302 to S307 are repeated until the end of the call.

Generally, the open loop power control is already working at the time of the communication channel initiation. The reverse link closed loop power control, however, is activated after the initialization of modulation and demodulation process in the mobile station and the base station respectively as described above.

According to the protocol shown in FIG. 5 the start of the closed loop power control S13 in the base station is typically earlier than that on the part of the mobile station S23. That means that the mobile station ignores all closed loop power control instructions (power control bits) from the base station received on the forward link, before starting the closed loop power control (before transmitting the preamble signal).

For half a round trip delay and at least one successfully completed demodulation process with SIR calculation on the part of the base station, the base station sends power control bits to the mobile station that do not relate to the actual SIR of the preamble. The round trip delay usually is negligible compared with the demodulation process time of the base station that, typically, can last several power control groups. During that delay time the SIR received at the base station is most likely to be smaller than the threshold, and the mobile station will be requested to increase its transmission power. this will lead to a transmission power overshoot, and consequently the interference to other mobile stations will increase.

Further, it has been realized that a temporary jammer or temporarily increased interference on the reverse link at the beginning of the acquisition of the communication channel can mislead the tracking of the correlators 141$_1$, 141$_2$, . . . , 141$_n$ and thus increase the demodulation delay. Since the SIR is generally less than the SIR threshold, a conventional closed loop power control method would request the mobile station to increase its transmission power rapidly by about 1 dB per power control group during that time, which often causes an unnecessary transmission power overshoot and interference.

SUMMARY OF THE INVENTION

The present invention was developed in view of the above-described problems of the prior art and has the object of realizing a closed loop power control method that keeps the closed loop increment of the transmission power of the mobile station almost constant until the base station succeeds to decode the first preamble frame without error. Thus it reduces interference. According to an aspect of the present invention, there is a method of controlling power upon call acquisition in a CDMA mobile communication system for adjusting transmission power to a mobile station by sending a power control adjustment signal from a base station to the mobile station via a forward link, comprising the steps of:

(a) determining a signal-to-interference ratio and a maximum transmission power level respectively as predetermined first and second thresholds;

(b) indicating a given power increment per predetermined period;

(c) measuring a signal-to-interference ratio of a reverse link signal received from the mobile station, comparing the measured signal-to-interference ratio with the first threshold determined in said step (a), and comparing a present transmission power level with the second threshold determined in said step (a);

(d) not indicating the power increment per said predetermined period if said measured signal-to-interference ratio is greater than said first threshold in said step (c) or if said present transmission power level is greater than said second threshold in said step (c);

(e) indicating a further power increment per said predetermined period if said measured signal-to-interference ratio is smaller than said first threshold in said step (c) or if said present transmission power level is smaller than said second threshold in said step (c);

(f) after said step (d) or said step (e), confirming whether a preamble signal from the mobile station is normally decoded, and returning to said step (c) if the preamble signal is not normally decoded; and (g) starting a closed-loop power control algorithm if it is confirmed that the preamble signal is normally decoded in said step (f).

According to another aspect of the present invention, there is a method of controlling power upon call acquisition in a CDMA mobile communication system for adjusting transmission power to a mobile station by sending a power control adjustment signal from a base station to the mobile station via a forward link, comprising the steps of:

(a) determining a signal-to-interference ratio and a maximum transmission power level respectively as predetermined first and second thresholds;

(b) indicating a given power increment per predetermined period;

(c) measuring a signal-to-interference ratio of a reverse link signal received from the mobile station, comparing the measured signal-to-interference ratio with the first threshold determined in said step (a), and comparing a present transmission power level with the second threshold determined in said step (a);

(d) indicating a power decrement per said predetermined period if said measured signal-to-interference ratio is greater than said first threshold in said step (c) or if said present transmission power level is greater than said second threshold in said step (c);

(e) indicating a further power increment per said predetermined period if said measured signal-to-interference ratio is smaller than said first threshold in said step (c) or if said present transmission power level is smaller than said second threshold in said step (c);

(f) after said step (d) or said step (e), confirming whether a preamble signal from the mobile station is normally decoded, and returning to said step (c) if the preamble signal is not normally decoded; and (g) starting a closed-loop power control algorithm if it is confirmed that the preamble signal is normally decoded in said step (f).

According to another aspect of the present invention, there is a method of controlling power upon call acquisition in a CDMA mobile communication system for adjusting transmission power to a mobile station by sending a power control adjustment signal from the mobile station to a base station via a reverse link, comprising the steps of:

(a) determining a signal-to-interference ratio and a maximum transmission power level respectively as predetermined first and second thresholds;
(b) indicating a given power increment per predetermined period;
(c) measuring a signal-to-interference ratio of a reverse link signal received from the base station, comparing the measured signal-to-interference ratio with the first threshold determined in said step (a), and comparing a present transmission power level with the second threshold determined in said step (a);
(d) not indicating the power increment per said predetermined period if said measured signal-to-interference ratio is greater than said first threshold in said step (c) or if said present transmission power level is greater than said second threshold in said step (c);
(e) indicating a further power increment per said predetermined period if said measured signal-to-interference ratio is smaller than said first threshold in said step (c) or if said present transmission power level is smaller than said second threshold in said step (c);
(f) after said step (d) or said step (e), confirming whether a preamble signal from the mobile station is normally decoded, and returning to said step (c) if the preamble signal is not normally decoded; and (g) starting a closed-loop power control algorithm if it is confirmed that the preamble signal is normally decoded in said step (f).

According to another aspect of the present invention, there is a method of controlling power upon call acquisition in a CDMA mobile communication system for adjusting transmission power to a mobile station by sending a power control adjustment signal from the mobile station to a base station via a reverse link, comprising the steps of:

(a) determining a signal-to-interference ratio and a maximum transmission power level respectively as predetermined first and second thresholds;
(b) indicating a given power increment per predetermined period;
(c) measuring a signal-to-interference ratio of a reverse link signal received from the base station, comparing the measured signal-to-interference ratio with the first threshold determined in said step (a), and comparing a present transmission power level with the second threshold determined in said step (a);
(d) indicating a power decrement per said predetermined period if said measured signal-to-interference ratio is greater than said first threshold in said step (c) or if said present transmission power level is greater than said second threshold in said step (c);
(e) indicating a further power increment per said predetermined period if said measured signal-to-interference ratio is smaller than said first threshold in said step (c) or if said present transmission power level is smaller than said second threshold in said step (c);
(f) after said step (d) or said step (e), confirming whether a preamble signal from the mobile station is normally decoded, and returning to said step (c) if the preamble signal is not normally decoded; and (g) starting a closed-loop power control algorithm if it is confirmed that the preamble signal is normally decoded in said step (f).

Wherein either of the above-described modifications, said power increment or decrement in said step (b), said step (c), or said step (d) is indicated in units of 0.1 dB.

And, wherein said closed-loop power control algorithm started in said step (g) comprises the steps of:
(h) determining a signal-to-interference ratio and a maximum allowable bit error ratio respectively as first and second thresholds;
(i) measuring a signal-to-interference ratio of a signal received from the mobile station or the base station, and comparing the measured signal-to-interference ratio with the first threshold determined in said step (h);
(j) indicating a power decrement if said measured signal-to-interference ratio is greater than said first threshold in said step (i);
(k) indicating a power increment if said measured signal-to-interference ratio is smaller than said first threshold in said step (i);
(l) after said step (j) or said step (k), measuring a maximum allowable bit error ratio of a signal received from the mobile station or the base station, and comparing the measured maximum allowable bit error ratio with the second threshold determined in said step (h);
(m) increasing said first threshold and thereafter returning to said step (i) if the measured maximum allowable bit error ratio is greater than the second threshold in said step (1); and
reducing said first threshold and thereafter returning to said step (i) if the measured maximum allowable bit error ratio is smaller than the second threshold in said step (1).

A closed loop power control method is introduced to avoid transmission power overshoot and increased interference at the beginning of the call acquisition between a base station and a mobile station. Upon initiating a call a closed loop power controller in the base station will send power control bits to the mobile station that will not change the transmission power in average. After the SIR level crosses the power control threshold the mobile station will be requested to increase its transmission power level in average by about 0.1 dB per request. When finally one payload frame of the preamble signal sent by the mobile station is decoded without error, the automatic closed loop power control procedure, as it is well known in the art, is started. By the here described closed loop power control method a transmission power overshoot can be avoided and thus interference to other mobile stations is alleviated.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
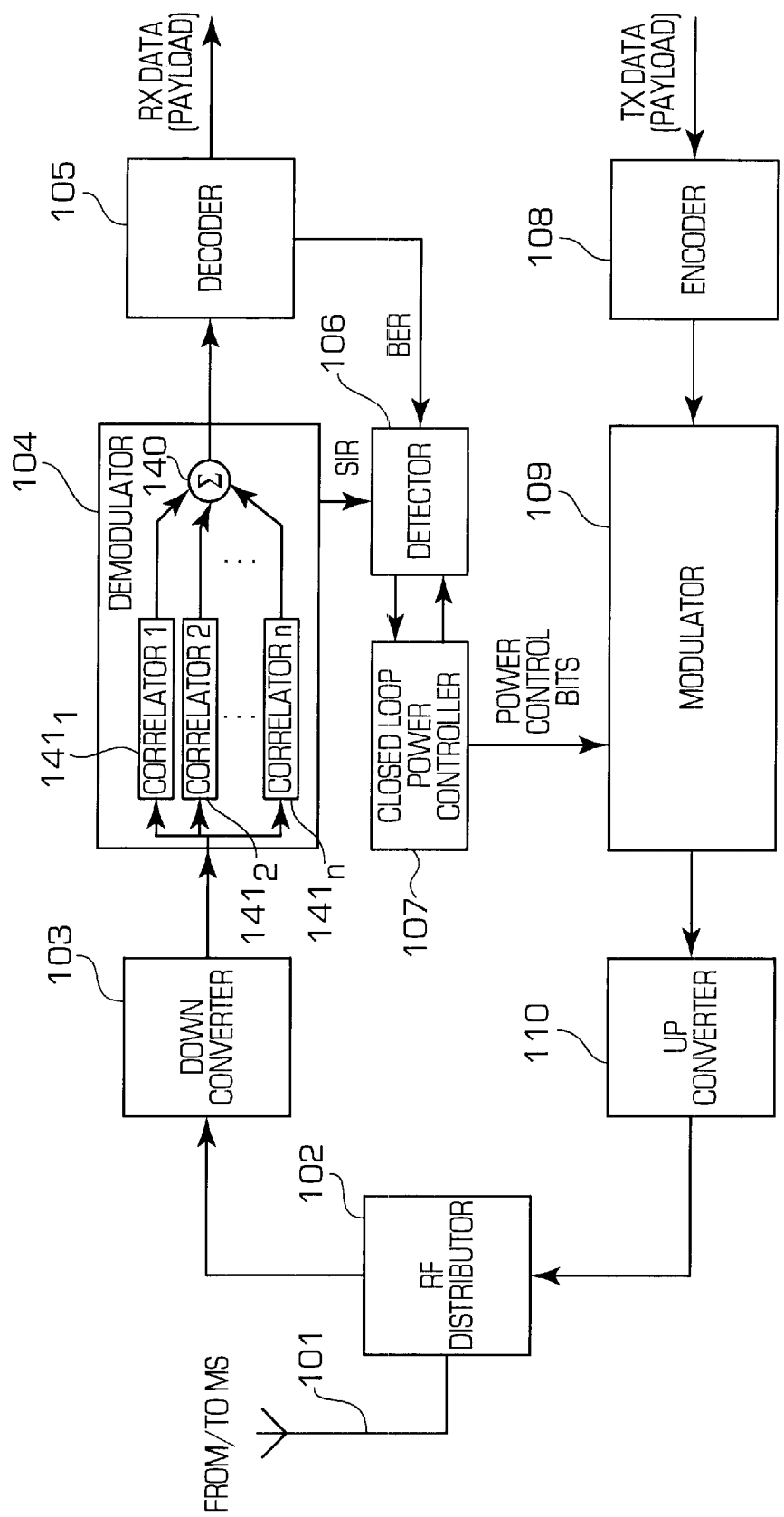
FIG. 1 is a block diagram of the receiver of the base station using a conventional closed loop power control system.
Figure 2:
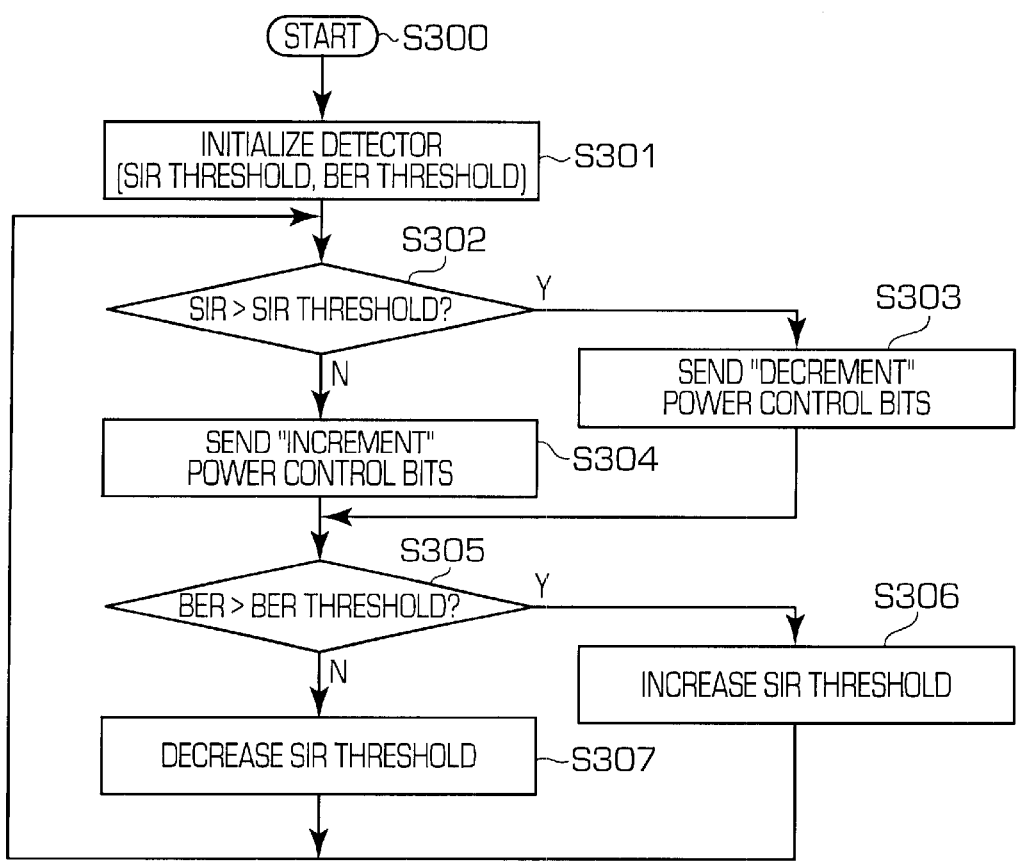
FIG. 2 is a flowchart of a conventional closed loop power control.
Figure 3:
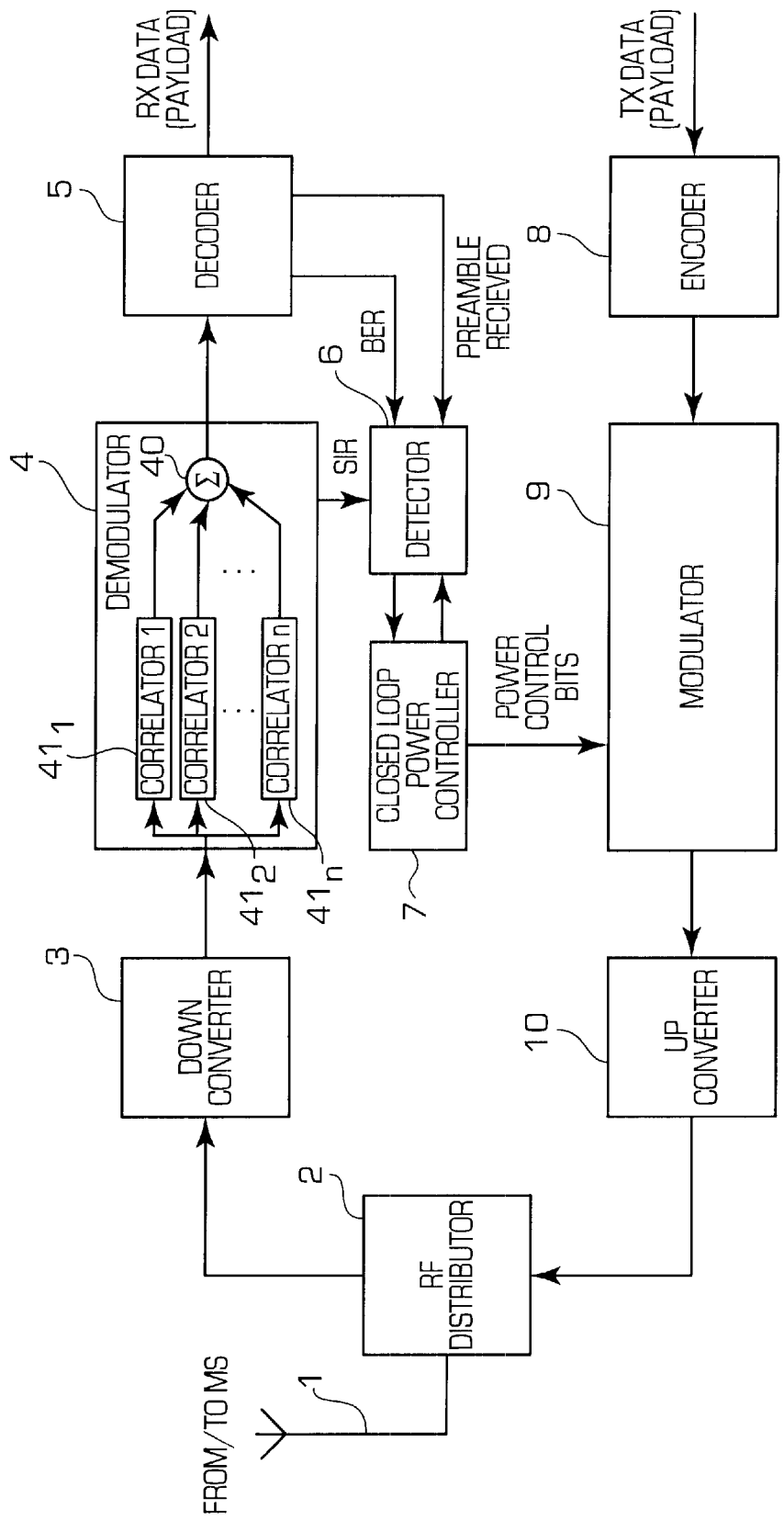
FIG. 3 is a block diagram of the receiver of the base station showing the closed loop power control system used by the presented invention.

FIG. 3 shows an example of a base station receiver in a CDMA mobile communication system which embodies the preferred closed loop power control system. A multipath signal transmitted by a mobile station is received by an antenna 1, and relayed to a down converter 3 via a radio frequency distributor 2. The signal is down-converted into a digital IF signal which is input into the demodulator 4. Each correlator $41_1$, $41_2$, ..., $41_n$ applies the spreading code determined by the mobile station to the input signal of the demodulator 4 to extract the multipaths which are combined in the summer 40. The output signal of the summer 40 is coupled to the decoder 5, while the SIR of the output signal is measured and sent to the detector 6. The decoder 5 finally processes the: original payload information signal, and determines the communication quality by measuring the BER of the decoded payload. The BER is output to the detector 6. Further does the detector 6 receive from the decoder 5 a signal indicating that a preamble frame has been decoded without error. The detector 6 comprises a comparison of the SIR level with the power control threshold and a comparison of the BER with a nominal maximum permitted BER that allows high quality communication.

Based on the result of the comparisons of SIR and BER in the detector 6 and the information whether a preamble frame has been decoded without error, the closed loop power controller 7 determines the power control bits. The power control bits are sent to the modulator 9 where they are inserted into the forward link communication channel signal.

On the other hand, on the forward link communication channel a payload information signal from the base station to the mobile station is encoded 8, spread spectrum modulated 9, and finally up-converted 10 into the radio frequency band and radiated by the antenna 1.

Figure 4:
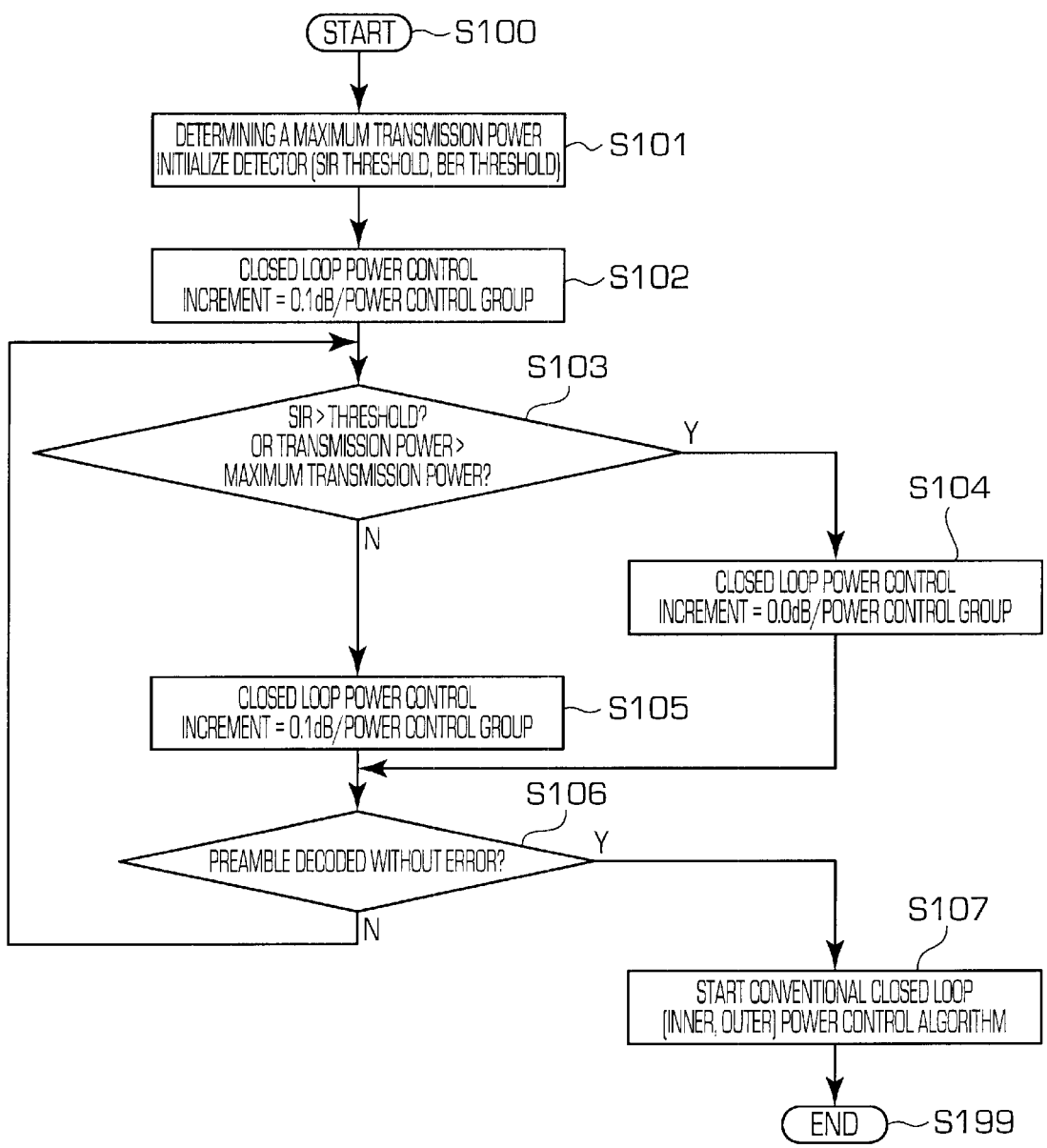
FIG. 4 is a flowchart showing the closed loop power control steps during the initial communication channel acquisition.
Figure 5:
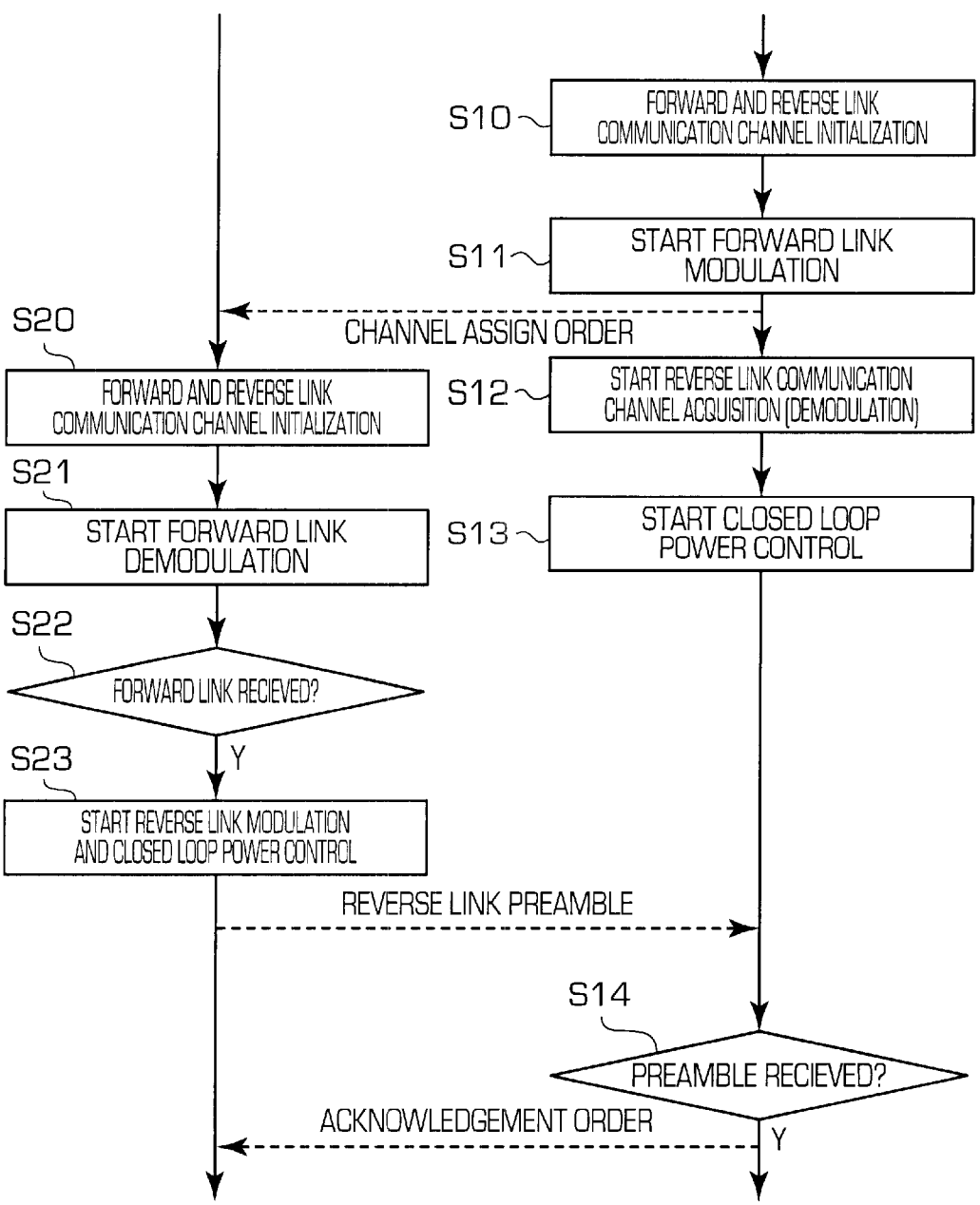
FIG. 5 shows the process flow at the mobile station and the base station during the communication channel acquisition.

Referring to FIG. 4 and FIG. 5 the closed loop power control method during call acquisition is described in detail.

As mentioned previously, upon request to establish a call between a base station and a mobile station, a forward and a reverse link communication channel has to be set up and initiated. Commonly the establishment process is started by the base station shown in FIG. 5. The base station initializes both, reverse and forward link communication channel S10, starts encoding, modulating and transmitting data on the forward link communication channel S11. Although in FIG. 5 it is drawn after S11, the start of the acquisition and demodulation of the reverse link communication S12, and the start of the closed loop power control process S13 is generally simultaneous. S13 corresponds to the start of the closed loop power control algorithm S100 in FIG. 4. At first the detector 6 is initialized S101 especially for receiving the reverse link preamble signal. Right after the initialization the closed loop power controller 7 generates power control bits requesting the mobile station to increase its transmission power level by 0.1 dB per power control group in average S102. For example, if an increment request is an increase by +1 dB, and a decrement request is a decrease by −1 dB per power control group, the base station will send 11 increments and 9 decrements so that the average will be a 2 dB increase per 20 power control groups. Of course, the arrangement of the increments and decrements is done in such a way that the fluctuation caused to the transmission power of the mobile station is kept at a minimum, such as an alternating pattern of increments and decrements.

The transmission of the channel assignment order message to the mobile station on a control or message channel on the forward link is performed at the same time. When the mobile station receives the channel assign order message, it will initialize its forward and reverse link process S20 and start the acquisition and demodulation of the forward link communication channel S21. The modulation and transmission of the reverse link communication channel S23, however, will not be carried out until a signal on the forward link communication channel has been received. At that time the mobile station will also invoke its part of the closed loop power control process S23 and the closed loop power control between base station and mobile station is closed. Before S23 the mobile station discards all power control bits received from the base station. After the mobile station has started the closed loop power control the reverse link transmission power is adjusted according to the received power control bits.

At first the mobile station transmits a preamble signal on the reverse link communication channel known at the base station, and therefore facilitates the synchronization of the correlators $41_1$, $41_2$, ..., $41_n$ in the demodulator 4. The mobile station will stop sending the preamble signal and start transmitting voice or data information on the reverse link communication channel after having received an acknowledgement message from the base station indicating that the base station has successfully received the preamble signal S14.

FIG. 4 shows the initial closed loop power control algorithm used in the present invention. The detector 6 is provided with the nominal SIR threshold and the nominal BER threshold. Generally, the BER threshold is a fixed value indicating the tolerated minimum communication quality. The SIR threshold is not subject to change because the outer loop power control algorithm that carries out this task is not invoked in the initial closed loop power control. In the next step the closed loop power control increment is set to a constant value S102 so that the mobile station will increase its transmission power 0.1 dB per power control group. If it is possible only to send either increment (increase transmission power by a predefined amount) or decrement (decrease transmission power by a predefined amount) requests as power control bits, the average increase per power control group is 0.1 dB. As described previously, that can be accomplished by generating power control bit sequence for several power control groups.

If the SIR is smaller than the SIR threshold S103, the power control increment is still set to 0.1 dB increment per power control group S105 and power control bits are sent to the mobile station accordingly. On the other hand, if the SIR is larger than the SIR threshold, power control bits are sent to the mobile station so that the closed loop power control in average does not contribute to either an increase or a decrease in the transmission power of the mobile station S104.

If a preamble frame has been decoded without yielding an error S106, the reverse link acquisition closed loop power control ends, and the conventional closed loop power control algorithm, as it is well known in the art, is started S107. This includes the formerly mentioned SIR threshold control by comparing the received BER to a nominal value (outer loop) which is disabled during the steps S100 to S107.

In case the decoding is still not error-free, the algorithm proceeds with the comparison of the SIR and the SIR threshold S103.

Using the presented closed loop power control method an overshoot of the transmission power of the mobile station during the initial reverse link communication channel acquisition can be avoided. Therefore, an enhanced communication quality can be provided because the interference caused to other mobile station in the same cell and to mobile station in neighbouring cells can be reduced.

Figure 6:
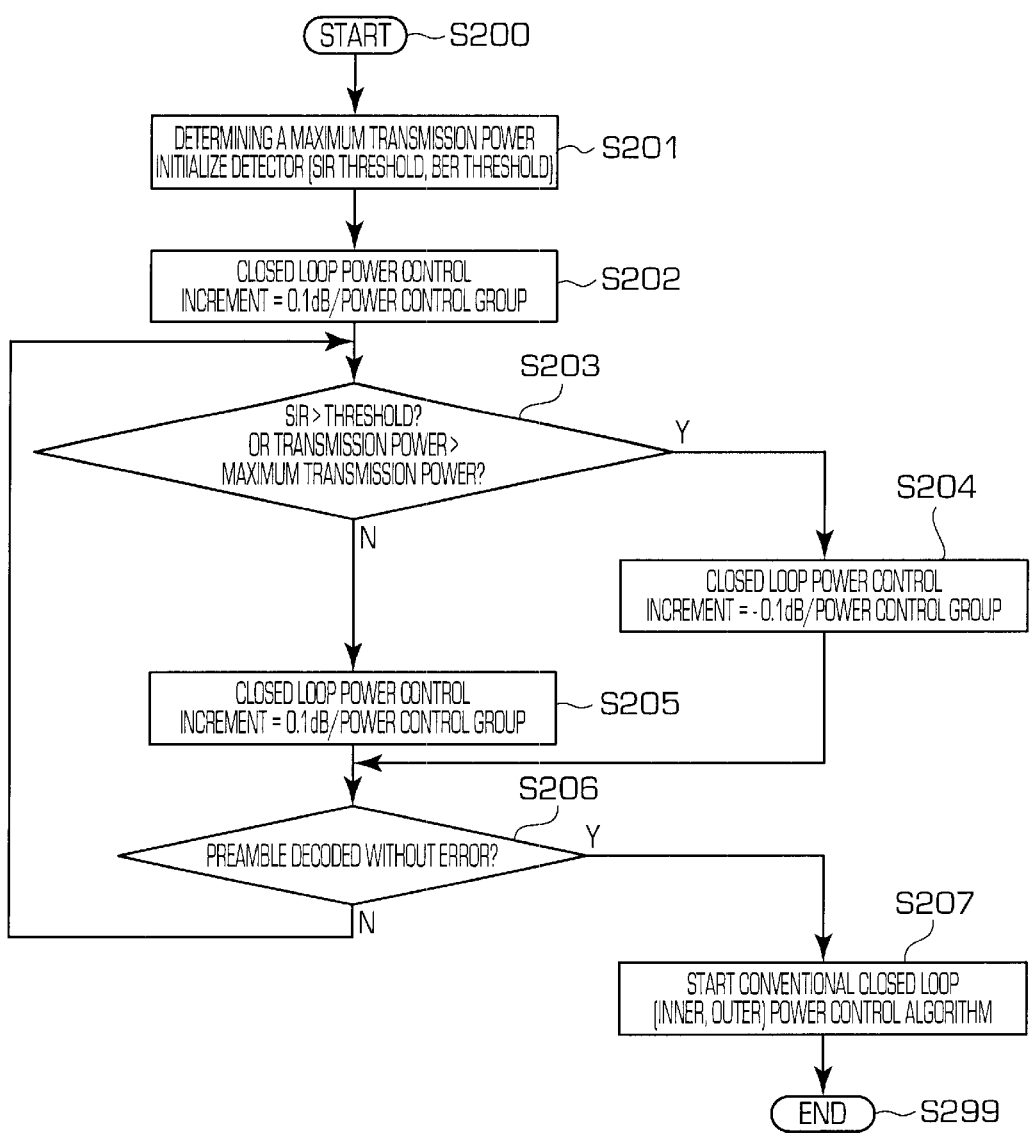
FIG. 6 is a flowchart showing the steps of another initial closed loop power control method during the initial communication channel acquisition.

FIG. 6 shows another example of an initial closed loop power control method. The only difference between the method shown in FIG. 4 and the one in FIG. 6 consists in the step S104 or S204 respectively. If the SIR is larger than the SIR threshold in the detector 6, power control bits force the mobile station to lower its transmission power level by an average of 0.1 dB per power control group.

Hence the initial closed loop power control comprises the same mechanism as the conventional closed loop power control with the difference that its operation is reduced by a factor 10 or more, the outer loop power control is disabled, and after a first preamble frame has been received without error the conventional closed loop power control with its full operation is restored.

Instead of controlling the initial reverse link transmission power the initial closed loop power control method described can also be used to control the initial forward link transmission power such as in forward link power control.

What is claimed is:

1. A method of controlling power upon call acquisition in a CDMA mobile communication system for adjusting transmission power to a mobile station by sending a power control adjustment signal from a base station to the mobile station via a forward link, comprising the steps of:
   (a) determining a signal-to-interference ratio and a maximum transmission power level respectively as predetermined first and second thresholds;
   (b) indicating a given power adjustment per predetermined period;
   (c) measuring a signal-to-interference ratio of a reverse link signal received from the mobile station, comparing the measured signal-to-interference ratio with the first threshold determined in said step (a), and comparing a present transmission power level with the second threshold determined in said step (a);
   (d) not indicating the power adjustment per said predetermined period if said measured signal-to-interference ratio is greater than said first threshold in said step (c) or if said present transmission power level is greater than said second threshold in said step (c);
   (e) indicating the power adjustment per said predetermined period, said power adjustment being a power increment, if said measured signal-to-interference ratio is smaller than said first threshold in said step (c) or if said present transmission power level is smaller than said second threshold in said step (c);
   (f) after said step (d) or said step (e), confirming whether a preamble signal from the mobile station is normally decoded, and returning to said step (c) if the preamble signal is not normally decoded; and
   (g) starting a closed-loop power control algorithm if it is confirmed that the preamble signal is normally decoded in said step (f).

2. A method of controlling power upon call acquisition in a CDMA mobile communication system for adjusting transmission power to a mobile station by sending a power control adjustment signal from a base station to the mobile station via a forward link, comprising the steps of:
   (a) determining a signal-to-interference ratio and a maximum transmission power level respectively as predetermined first and second thresholds;
   (b) indicating a given power adjustment per predetermined period;
   (c) measuring a signal-to-interference ratio of a reverse link signal received from the mobile station, comparing the measured signal-to-interference ratio with the first threshold determined in said step (a), and comparing a present transmission power level with the second threshold determined in said step (a);
   (d) indicating the power adjustment per said predetermined period, said power adjustment being a power decrement, if said measured signal-to-interference ratio is greater than said first threshold in said step (c) or if said present transmission power level is greater than said second threshold in said step (c);
   (e) indicating the power adjustment per said predetermined period, said power adjustment being a power increment, if said measured signal-to-interference ratio is smaller than said first threshold in said step (c) or if said present transmission power level is smaller than said second threshold in said step (c);
   (f) after said step (d) or said step (e), confirming whether a preamble signal from the mobile station is normally decoded, and returning to said step (c) if the preamble signal is not normally decoded; and
   (g) starting a closed-loop power control algorithm if it is confirmed that the preamble signal is normally decoded in said step (f).

3. A method of controlling power upon call acquisition in a CDMA mobile communication system for adjusting transmission power to a mobile station by sending a power control adjustment signal from the mobile station to a base station via a reverse link, comprising the steps of:
   (a) determining a signal-to-interference ratio and a maximum transmission power level respectively as predetermined first and second thresholds;
   (b) indicating a given power adjustment per predetermined period;
   (c) measuring a signal-to-interference ratio of a reverse link signal received from the base station, comparing the measured signal-to-interference ratio with the first threshold determined in said step (a), and comparing a present transmission power level with the second threshold determined in said step (a);
   (d) not indicating the power adjustment per said predetermined period if said measured signal-to-interference ratio is greater than said first threshold in said step (c) or if said present transmission power level is greater than said second threshold in said step (c);
   (e) indicating the power adjustment per said predetermined period, said power adjustment being a power increment, if said measured signal-to-interference ratio is smaller than said first threshold in said step (c) or if said present transmission power level is smaller than said second threshold in said step (c);
   (f) after said step (d) or said step (e), confirming whether a preamble signal from the base station is normally decoded, and returning to said step (c) if the preamble signal is not normally decoded; and
   (g) starting a closed-loop power control algorithm if it is confirmed that the preamble signal is normally decoded in said step (f).

4. A method of controlling power upon call acquisition in a CDMA mobile communication system for adjusting transmission power to a mobile station by sending a power control adjustment signal from the mobile station to a base station via a reverse link, comprising the steps of:

(a) determining a signal-to-interference ratio and a maximum transmission power level respectively as predetermined first and second thresholds;

(b) indicating a given power adjustment per predetermined period;

(c) measuring a signal-to-interference ratio of a reverse link signal received from the base station, comparing the measured signal-to-interference ratio with the first threshold determined in said step (a), and comparing a present transmission power level with the second threshold determined in said step (a);

(d) indicating the power adjustment per said predetermined period, said power adjustment being a power decrement, if said measured signal-to-interference ratio is greater than said first threshold in said step (c) or if said present transmission power level is greater than said second threshold in said step (c);

(e) indicating the power adjustment per said predetermined period, said power adjustment being a power increment, if said measured signal-to-interference ratio is smaller than said first threshold in said step (c) or if said present transmission power level is smaller than said second threshold in said step (c);

(f) after said step (d) or said step (e), confirming whether a preamble signal from the base station is normally decoded, and returning to said step (c) if the preamble signal is not normally decoded; and (g) starting a closed-loop power control algorithm if it is confirmed that the preamble signal is normally decoded in said step (f).

5. A method according to claim 1, wherein said power adjustment in said step (b), said step (d), or said step (e) is indicated in units of 0.1 dB.

6. A method according to claim 2, wherein said power adjustment in said step (b), said step (d), or said step (e) is indicated in units of 0.1 dB.

7. A method according to claim 3, wherein said power adjustment in said step (b), said step (d), or said step (e) is indicated in units of 0.1 dB.

8. A method according to claim 4, wherein said power adjustment in said step (b), said step (d), or said step (e) is indicated in units of 0.1 dB.

9. A method according to claim 1, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured signal-to-interference ratio is smaller than said first threshold in said step (i);

(l) after said step A) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

10. A method according to claim 2, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-10 interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured signal-to-interference ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

11. A method according to claim 3, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured signal-to-interference ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

12. A method according to claim 4, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

13. A method according to claim 5, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured signal-to-interference ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

14. A method according to claim 6, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured signal-to-interference ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

15. A method according to claim 7, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, said measured signal-to-interference ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

16. A method according to claim 8, wherein said closed-loop power control algorithm started in said step (g) comprises the steps of:

(h) determining a signal-to-interference ratio and a maximum allowable bit error ratio respectively as first and second thresholds;

(i) measuring a signal-to-interference ratio of a signal received from the mobile station or the base station, and comparing the measured signal-to-interference ratio with the first threshold determined in said step (h);

(j) indicating the power adjustment, said power adjustment being a power decrement, if said measured signal-to-interference ratio is greater than said first threshold in said step (i);

(k) indicating the power adjustment, said power adjustment being a power increment, if said measured ratio is smaller than said first threshold in said step (i);

(l) after said step (j) or said step (k), measuring a maximum allowable bit error ratio of a signal received from the mobile station or the base station, and comparing the measured maximum allowable bit error ratio with the second threshold determined in said step (h);

(m) increasing said first threshold and thereafter returning to said step (i) if the measured maximum allowable bit error ratio is greater than the second threshold in said step (1); and (n) reducing said first threshold and thereafter returning to said step (i) if the measured maximum allowable bit error ratio is smaller than the second threshold in said step (1).

* * * * *